(12) United States Patent
Barger et al.

(10) Patent No.: US 6,513,392 B1
(45) Date of Patent: Feb. 4, 2003

(54) CORIOLIS MASS FLOW CONTROLLER

(75) Inventors: Michael J. Barger, Souderton, PA (US); Joseph C. Dille, Telford, PA (US); Jeffrey L. Whiteley, Quakertown, PA (US); Timothy W. Scott, Lansdale, PA (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/326,949

(22) Filed: Jun. 7, 1999

Related U.S. Application Data

(60) Provisional application No. 60/111,504, filed on Dec. 8, 1998.

(51) Int. Cl.[7] .................................................. G01F 1/84
(52) U.S. Cl. .................................................. 73/861.356
(58) Field of Search ..................... 73/861.355, 861.356, 73/861.357

(56) References Cited

U.S. PATENT DOCUMENTS

| | | | |
|---|---|---|---|
| 4,109,524 A | 8/1978 | Smith ........................ | 73/194 B |
| 4,127,028 A | 11/1978 | Cox et al. .................. | 73/194 B |
| 4,252,028 A | 2/1981 | Smith et al. .............. | 73/861.38 |
| RE31,450 E | 11/1983 | Smith ....................... | 73/861.38 |
| 4,422,338 A | 12/1983 | Smith ....................... | 73/861.38 |
| 4,444,059 A | 4/1984 | Smith ....................... | 73/861.37 |
| 4,449,893 A | 5/1984 | Beckman et al. ........... | 417/322 |
| 4,491,009 A | 1/1985 | Ruesch ....................... | 73/32 A |
| 4,491,025 A | 1/1985 | Smith et al. .............. | 73/861.38 |
| 4,726,508 A | 2/1988 | Carpenter ............... | 228/263.13 |
| 4,738,143 A | 4/1988 | Cage et al. .............. | 73/861.38 |
| 4,738,144 A | 4/1988 | Cage ........................ | 73/861.38 |
| 4,747,312 A | 5/1988 | Herzl ....................... | 73/861.38 |
| 4,756,198 A | 7/1988 | Levien ..................... | 73/861.38 |
| 4,768,384 A | 9/1988 | Flecken et al. .......... | 73/861.02 |
| 4,768,385 A | 9/1988 | Cage ........................ | 73/861.38 |
| 4,777,833 A | 10/1988 | Carpenter ................ | 73/861.38 |
| 4,817,448 A | 4/1989 | Hargarten et al. ....... | 73/861.38 |
| 4,823,592 A | 4/1989 | Hahn ........................ | 73/3 |
| 4,823,613 A | 4/1989 | Cage et al. .............. | 73/861.38 |
| 4,823,614 A * | 4/1989 | Dahlin ..................... | 73/861.38 |
| 4,831,885 A | 5/1989 | Dahlin ..................... | 73/861.38 |

(List continued on next page.)

FOREIGN PATENT DOCUMENTS

| | | |
|---|---|---|
| DE | 196 05 923 | 8/1997 |
| GB | 2 221 302 | 1/1990 |
| WO | 92 14123 | 8/1992 |
| WO | WO9409344 | 4/1994 |
| WO | 96 21159 | 7/1996 |
| WO | WO97/26508 | 7/1997 |
| WO | WO0034748 | 6/2000 |

OTHER PUBLICATIONS

Novel Resonant Micromachined Silicon Devices for Fluid Applications (Densitometer, Coriolis Mass Flow Sensor and Diffuser Pump), by Peter Enoksson, submitted to the School of Electrical Engineering, Royal Institute of Technology, in partial fulfilment of the requirements for the degree of Doctor of Philosophy.

*Primary Examiner*—Benjamin R. Fuller
*Assistant Examiner*—Jewel V. Thompson
(74) *Attorney, Agent, or Firm*—Howrey Simon Arnold & White

(57) ABSTRACT

A Coriolis mass flow sensor includes a flow sensor tube, a drive device situated relative to the flow sensor tube so as to cause the flow sensor tube to vibrate, and capacitance displacement gauges situated relative to the flow sensor tube so as to measure the twist in the flow sensor tube due to Coriolis force. In specific embodiments, electromagnetic, electrostatic, acoustic, and/or piezoelectric drives are used to vibrate the flow sensor tube. In still further embodiments, piezoelectric devices are used both to vibrate the flow sensor tube and measure the twist in the flow sensor tube. In accordance with certain embodiments of the invention, the Coriolis mass flow controller further includes an integrated flow control device adapted to receive fluid from the flow sensor tube and provide flow control.

6 Claims, 13 Drawing Sheets

U.S. PATENT DOCUMENTS

| | | | |
|---|---|---|---|
| 4,843,890 A | 7/1989 | Samson et al. | 73/861.38 |
| 4,845,989 A | 7/1989 | Titlow et al. | 73/597 |
| 4,872,351 A | 10/1989 | Ruesch | 73/861.04 |
| 4,876,879 A | 10/1989 | Ruesch | 73/32 A |
| 4,876,898 A | 10/1989 | Cage et al. | 73/861.38 |
| 4,879,911 A | 11/1989 | Zolock | 73/861.38 |
| 4,895,031 A | 1/1990 | Cage | 73/861.38 |
| 4,899,588 A | 2/1990 | Titlow et al. | 73/597 |
| 4,911,006 A | 3/1990 | Hargarten et al. | 73/198 |
| 4,934,196 A | 6/1990 | Romano | 73/861.38 |
| 4,955,239 A | 9/1990 | Cage et al. | 73/861.38 |
| 4,996,871 A | 3/1991 | Romano | 73/32 A |
| 5,009,109 A | 4/1991 | Kalotay et al. | 73/861.38 |
| 5,027,662 A | 7/1991 | Titlow et al. | 73/861.38 |
| 5,157,975 A | 10/1992 | Tanaka et al. | 73/861.38 |
| 5,228,327 A | 7/1993 | Bruck | 73/3 |
| 5,231,884 A | 8/1993 | Zolock | 73/861.38 |
| 5,233,312 A | 8/1993 | Duft et al. | 330/259 |
| 5,295,084 A | 3/1994 | Arunachalam et al. | 364/558 |
| 5,301,557 A | 4/1994 | Cage et al. | 73/861.38 |
| 5,321,991 A | 6/1994 | Kalotay | 73/861.38 |
| 5,322,399 A | 6/1994 | Felbush | 409/131 |
| 5,331,859 A | 7/1994 | Zolock | 73/861.38 |
| 5,344,717 A | 9/1994 | Dutton, Jr. et al. | 428/598 |
| 5,347,874 A | 9/1994 | Kalotay et al. | 73/861.38 |
| 5,349,872 A | 9/1994 | Kalotay et al. | 73/861.38 |
| 5,357,811 A | 10/1994 | Hoang | 73/861.38 |
| 5,359,881 A | 11/1994 | Kalotay et al. | 73/54.06 |
| 5,370,002 A | 12/1994 | Normen et al. | 73/861.37 |
| 5,379,649 A | 1/1995 | Kalotay | 73/861.38 |
| 5,400,653 A | 3/1995 | Kalotay | 73/861.37 |
| 5,448,921 A | 9/1995 | Cage et al. | 73/861.38 |
| 5,469,748 A | 11/1995 | Kalotay | 73/861.38 |
| 5,493,918 A | 2/1996 | Barat et al. | 73/862.41 |
| 5,497,666 A | 3/1996 | Patten et al. | 73/861.38 |
| 5,549,009 A | 8/1996 | Zaschel | 73/861.355 |
| 5,555,190 A | 9/1996 | Derby et al. | 364/510 |
| 5,576,500 A * | 11/1996 | Cage et al. | 73/861.357 |
| 5,578,764 A * | 11/1996 | Yokio et al. | 73/861.356 |
| 5,594,180 A | 1/1997 | Carpenter et al. | 73/861.356 |
| 5,597,949 A | 1/1997 | Kalotay | 73/54.01 |
| 5,654,502 A | 8/1997 | Dutton | 73/152.18 |
| 5,661,232 A | 8/1997 | Van Cleve et al. | 73/54.05 |
| 5,679,906 A | 10/1997 | Van Cleve et al. | 73/861.353 |
| 5,687,100 A | 11/1997 | Buttler et al. | 364/558 |
| 5,705,754 A | 1/1998 | Keita et al. | 73/861.357 |
| 5,728,952 A | 3/1998 | Yao et al. | 73/861.357 |
| 5,734,112 A | 3/1998 | Bose et al. | 73/861.56 |
| 5,753,827 A | 5/1998 | Cage | 73/861.356 |
| 5,773,727 A | 6/1998 | Kishiro et al. | 73/861.355 |
| 5,796,010 A * | 8/1998 | Kishiro et al. | 73/861.357 |
| 5,796,011 A | 8/1998 | Keita et al. | 73/861.357 |
| 5,804,740 A | 9/1998 | Kalinoski et al. | 73/861.24 |
| 5,854,430 A | 12/1998 | Drahm et al. | 73/861.357 |
| 5,893,054 A * | 4/1999 | White | 702/189 |
| 5,975,126 A | 11/1999 | Bump et al. | 137/487.5 |
| 6,044,705 A * | 4/2000 | Neukermans et al. | 73/504.02 |
| 6,164,140 A * | 12/2000 | Kalinoski | 73/861.357 |

* cited by examiner

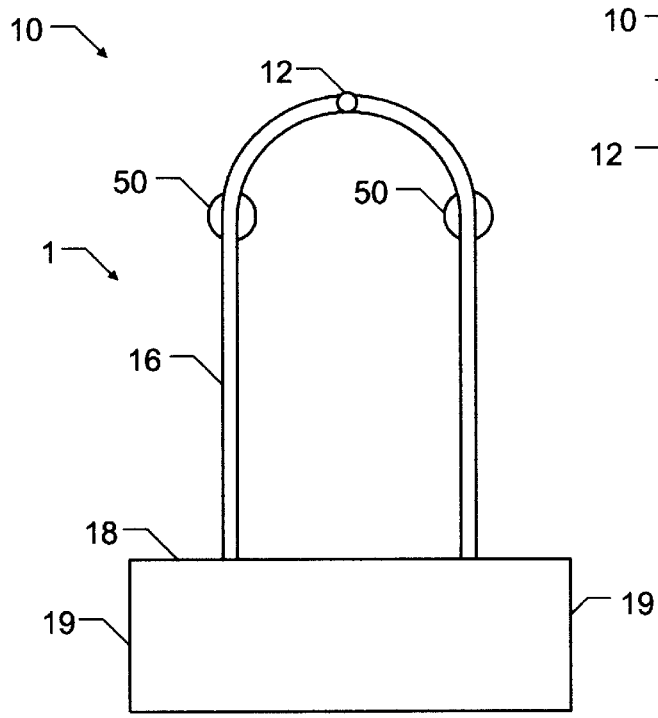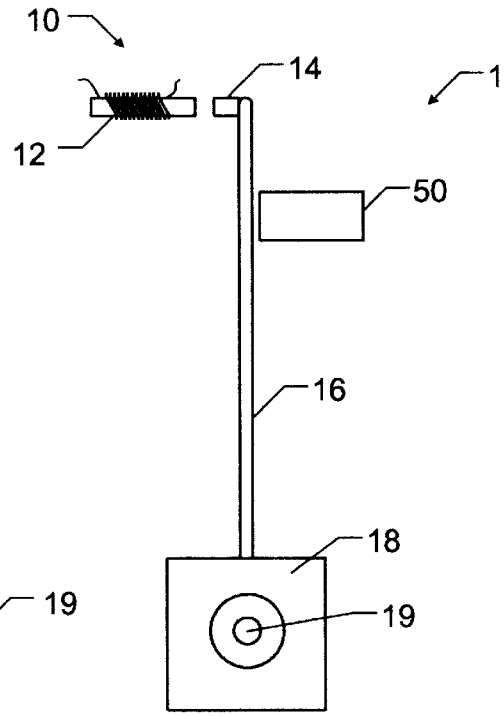
FIG. 2A  FIG. 2B
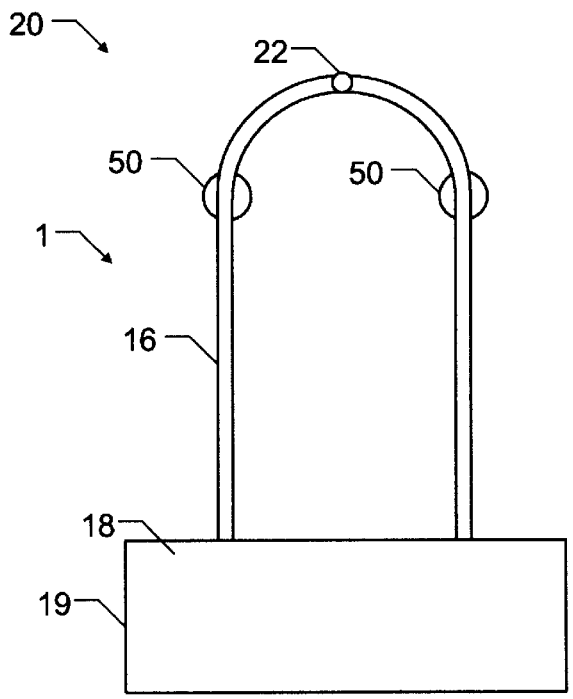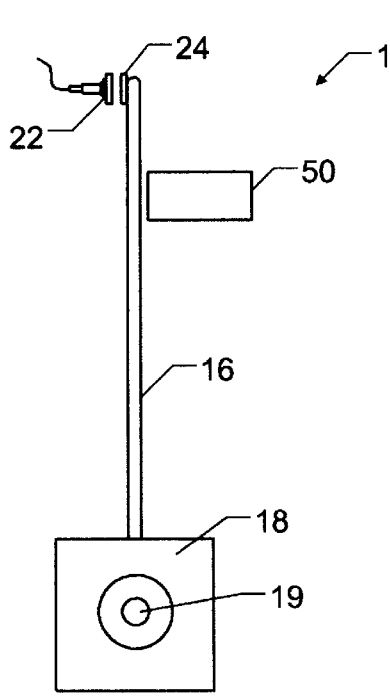
FIG. 3A  FIG. 3B

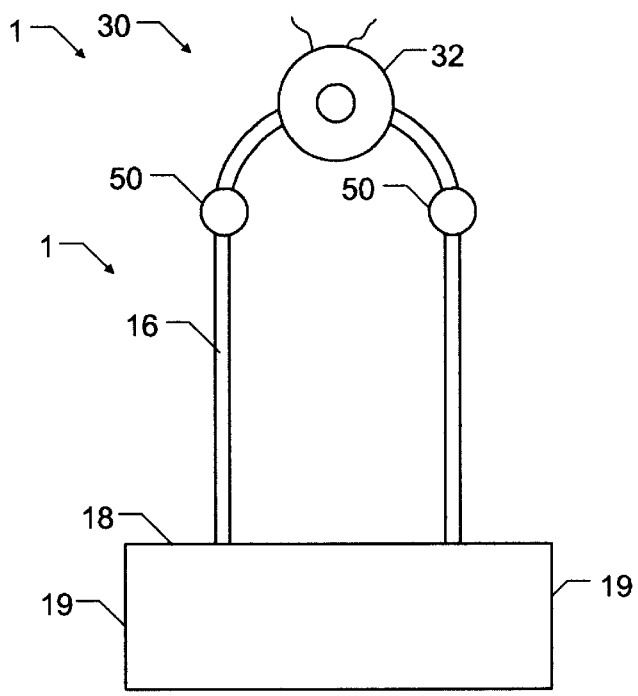
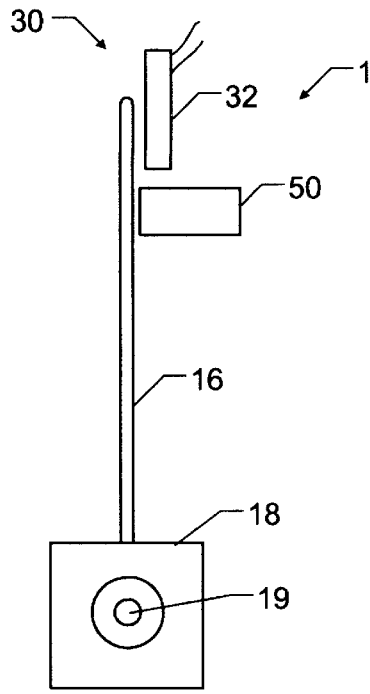
FIG. 4A  FIG. 4B
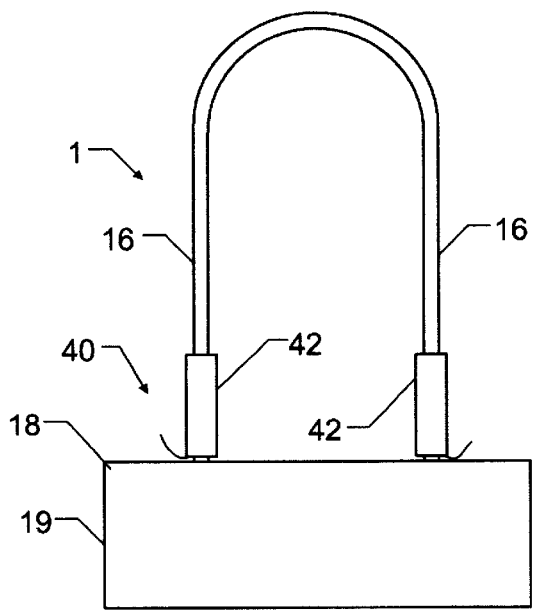
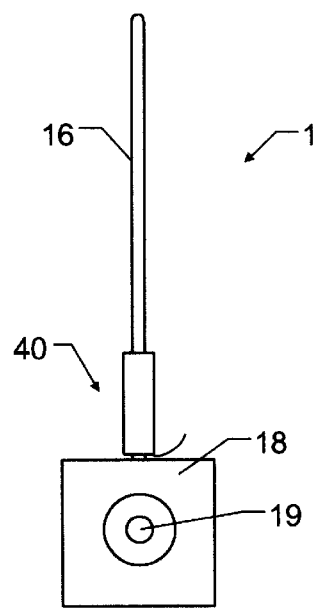
FIG. 5A  FIG. 5B
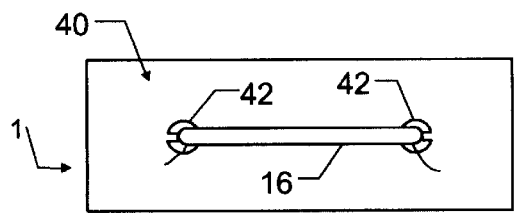
FIG. 5C

CORIOLIS MASS FLOW CONTROLLER

This application claims the benefit of Provisional Application No. 60/111,504, filed Dec. 8, 1998.

BACKGROUND OF THE INVENTION

1. Field of the Invention

The invention relates generally to a mass flow measurement and control, and more particularly, to a mass flow measurement and control device based on the Coriolis force effect and having an integrated flow control valve with associated sense, control and communication electronics.

2. Description of the Related Art

Mass flow measurement based on the Coriolis force effect is achieved in the following manner. The Coriolis force results in the effect of a mass moving in an established direction and then being forced to change direction with a vector component normal to the established direction of flow. This can be expressed by the following equation:

$$\vec{F}_c = \vec{M} \times \vec{\omega}$$

Where $\vec{F}_c$ (the Coriolis force vector) is the result of the cross product of $\vec{M}$ (the mass flow vector) and $\vec{\omega}$ (the angular velocity vector).

In a rotating system, the angular velocity vector is aligned along the axis of rotation. Using the "Right Hand Rule", the fingers define the direction of rotation and the thumb, extended, defines the angular velocity vector direction. In the case of the typical Coriolis force flow sensor, a tube, through which fluid flow is to be established, is vibrated. Often the tube is in the shape of one or more loops. The loop shape is such that the mass flow vector is directed in opposite directions at different parts of the loop. The tube loops may, for example, be "U" shaped, rectangular, triangular or "delta" shaped or coiled. In the special case of a straight tube, there are two simultaneous angular velocity vectors that are coincident to the anchor points of the tube while the mass flow vector is in a single direction.

The angular velocity vector changes directions since, in a vibrating system, the direction of rotation changes. The result is that, at any given time, the Coriolis force is acting in opposite directions where the mass flow vectors or the angular velocity vectors are directed in opposite directions. Since the angular velocity vector is constantly changing due to the vibrating system, the Coriolis force is also constantly changing. The result is a dynamic twisting motion being imposed on top of the oscillating motion of the tube. The magnitude of twist is proportional to the mass flow for a given angular velocity.

Mass flow measurement is achieved by measuring the twist in the sensor tube due to the Coriolis force generated by a fluid moving through the sensor tube. Known devices use magnet and coil pairs located on the flow tube where the Coriolis force's induced displacement is expected to be greatest. The coil and magnet are mounted on opposing structures, for example, the magnet is mounted on the tube and the coil is mounted on the stationary package wall. The magnet will move in and out of the coil, inducing a current in the coil. This current is proportional to the velocity of the magnet relative to the coil. Since this is a velocity measurement, the velocity, and thus the signal, is at the maximum when the flow tube crosses its rest point (zero crossing). The Coriolis force induced twist causes a phase shift in the velocity signal that is detected by measuring the difference in the zero crossing times between the two velocity sensors. In practice this places a large accuracy burden on the time measurement circuitry. This may limit the ultimate sensitivity of mass flow measurement by this technique.

Further, the flow rate capabilities of known devices based on Coriolis technology often are limited to flow rates that are higher than desired for many applications. Moreover, existing Coriolis mass flow measuring devices only provide for mass flow sensing with no integral flow control capabilities. It has been left to the user to provide any means for controlling flow.

The present invention addresses shortcomings associated with the prior art.

SUMMARY OF THE INVENTION

In one aspect of the present invention, a Coriolis mass flow sensor includes a flow sensor tube, a drive device situated relative to the flow sensor tube so as to cause the flow sensor tube to vibrate, and capacitance displacement gauges situated relative to the flow sensor tube so as to measure the twist in the flow sensor tube due to Coriolis force. In specific embodiments, electromagnetic, electrostatic, acoustic, and/or piezoelectric drives are used to vibrate the flow sensor tube. In still further embodiments, piezoelectric devices are used both to vibrate the flow sensor tube and measure the twist in the flow sensor tube.

In another aspect of the present invention, a Coriolis mass flow controller includes a flow sensor tube, a drive device situated relative to the flow sensor tube so as to cause the flow sensor tube to vibrate and a position sensing device situated relative to the flow sensor tube so as to measure the twist in the flow sensor tube due to Coriolis force. The Coriolis mass flow controller further includes an integrated flow control device adapted to receive fluid from the flow sensor tube. Such an integrated flow valve with associated sensing electronics provide a more compact package that is easier to use and provides significant improvement in dynamic performance.

BRIEF DESCRIPTION OF THE DRAWINGS

Other objects and advantages of the invention will become apparent upon reading the following detailed description and upon reference to the drawings in which:

FIGS. 2A and 2B illustrate a Coriolis mass flow sensor employing an electromagnetic drive in accordance with an embodiment if the present invention;

FIGS. 3A and 3B illustrate a Coriolis mass flow sensor employing an electrostatic drive in accordance with an embodiment if the present invention;

FIGS. 4A and 4B illustrate a Coriolis mass flow sensor employing an acoustic drive in accordance with an embodiment if the present invention;

FIGS. 5A, 5B and 5C illustrate a Coriolis mass flow sensor employing a piezoelectric drive in accordance with an embodiment if the present invention;

Figure 1:
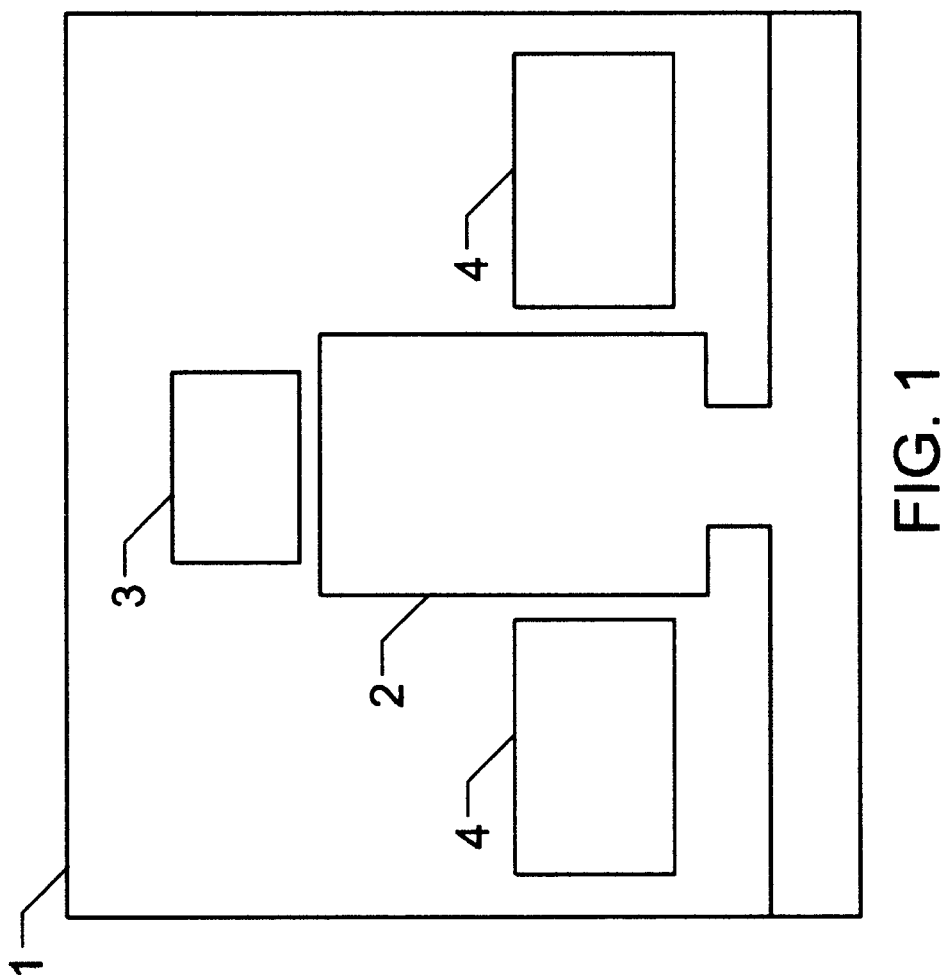
FIG. 1 is a block diagram conceptually illustrating a Coriolis mass flow sensor in accordance with aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 is a block diagram conceptually illustrating a Coriolis mass flow sensor in accordance with aspects of the present invention. The Coriolis mass flow sensor 1 includes a flow sensor tube 2, with a drive device 3 situated relative thereto so as to vibrate the tube 2. Displacement gauges 4 are positioned relative to the tube 2 so as to measure the twist in the tube 2 due to Coriolis force.

A typical material for the sensor tube 2 is 316L stainless steel. Reasons for using 316L stainless steel include that it is resistant to chemical attack from many substances, it is resistant to rupture from normal process pressures, it is typically noncontaminating and can be readily formed to the desired shape of a Coriolis sensor tube. However, 316L stainless steel is not suitable for all applications. Therefore, it is necessary that other tube materials be available to cover applications not suitable for 316L stainless steel. Known devices use silicon as an alternate material to 316L stainless steel. The advantage of silicon over 316L stainless steel is that sensor tubes can be made in a smaller form than can be realized by 316L stainless steel.

Another consideration for material selection for the sensor tube 2 is the resistance to stress induced or enhanced corrosion. Stress is generated at the base of the bending arm where the tubes are mounted. In polycrystalline materials stress will cause impurities in the material to diffuse and concentrate at grain boundaries between the microcrystalline granular regions. This will, in many cases, weaken the bonds between the microcrystalline grains making the material to be more susceptible to chemical attack. Single crystal materials like silicon or sapphire are less likely to be affected in this manner.

Metals, like 316L stainless steel are usually polycrystalline and therefore more susceptible to this type of chemical attack to varying degrees. Amorphous materials like silica glass and several plastics also are more resistant to stress induced chemical attack, since they do not have a grain structure like polycrystalline materials. Tube materials that are susceptible to chemical attack may have their surfaces modified or coated in such a way to minimize corrosion or attack at the surfaces if the use of the underlying material is otherwise attractive.

Surface modification may be accomplished by ion implantation, thermal diffusion, and chemical or electrochemical reaction. The intent, here, is to remove, redistribute, or introduce elemental or molecular species that leave a chemically resistant layer at the surface. Surface coating may be accomplished by thermally activated deposition from a vapor, liquid or powder impinging on the surface at elevated temperatures. Lower temperatures may be used if the chemically reactive species is also excited or ionized by plasma or an intense photon flux as from a laser. Other materials resistant to chemical attack may be deposited by nonreactive, physical vapor deposition as accomplished by thermal or electron beam evaporation or by ion sputtering. If sputtering is accomplished using a highly energetic ion beam so that the sputtered species is chemically excited or ionized, then a chemical reaction with the surface is also accomplished, which may be desirable for certain deposited materials. Also, chemical reactions at the surface may be accomplished by accelerating the chemical species so that the kinetic energy can be used to activate or enhance the chemical reaction.

Tube materials used for the Coriolis flow sensing tube 2 in particular embodiments of the present invention are Austenitic and Martensitic stainless steels, high nickel alloys, Titanium and Zirconium and their alloys, particularly Titanium-Vanadium-Aluminum alloys and Zircalloy (for their high yield strength and low Young's modulus),silicon, sapphire, silicon carbide, silica glass and plastics. Tube coating materials employed in accordance with the present invention include silicon carbide, nickel, chrome, diamond, the refractory carbides, the refractory metal nitrides, and refractory metal oxides.

FIGS. 2A and 2B illustrate a Coriolis mass flow sensor 1 in accordance with particular embodiments of the present invention. The Coriolis mass flow sensor 1 employs an electromagnetic drive 10 that includes an electromagnet 12 driven by a signal source (not shown), which, in the embodiment illustrated, comprises a sinusoidal signal source. The electromagnet 12 is situated near a small permanent magnet 14 mounted on a sensor tube 16. The sensor tube 16 is connected to a base 18 that includes first and second ports 19, so as to define a flow path from one port 19 through the flow tube 16 to the other port 19. The exemplary sensor tube 16 shown in the embodiments disclosed herein is generally "U" shaped, though other shapes, such as delta shaped, rectangular, coiled, or straight tubes may also be used.

FIGS. 3A and 3B illustrate an embodiment similar to that shown in FIG. 2, using an electrostatic drive. The electrostatic drive 20 includes a charge plate 22 positioned near a small dielectric plate 24 mounted on the sensor tube 16. If the tube 16 is made of dielectric material, then the charge plate 22 is positioned near the tube 16 and the dielectric plate 24 may be eliminated. Again, the charge plate is driven by a signal source (not shown), such as a sinusoidal signal source. A voltage applied to the charge plate 22 will produce an electric field between it and the dielectric plate 24. This will produce a surface charge on the dielectric plate 24. As the voltage polarity is rapidly is changed on the charge plate 22, the resultant electric field between it and the dielectric plate 24 will alternately be attractive or repulsive causing the flow tube 16 to vibrate.

FIGS. 4A and 4B illustrate another embodiment of the Coriolis mass flow sensor 1 that employs a novel acoustic drive 30. The acoustic drive 30 includes a small speaker 32 placed near the tube 16. The pressure waves generated by the speaker 32 cause the tube 16 to vibrate.

In FIGS. 5A, 5B and 5C, yet another embodiment of the Coriolis mass flow sensor 1 is illustrated. The Coriolis mass flow sensor 1 of FIGS. 5A, 5B and 5C uses a piezoelectric drive 40, wherein two piezoelectric stacks 42 are positioned on opposite sides each leg of the flow tube 16, in effect creating two bimorphs on each leg 16 as shown in FIG. 5. The piezoelectric and reverse piezoelectric effects would be used to either drive and/or sense the deflection of the tube 16.

Mass flow measurement is achieved by measuring the twist in the sensor tube 16 due to the Coriolis force generated by a fluid moving through the sensor tube 16. For example, magnet and coil pairs may be located on the flow tube 16 where the Coriolis forces induced displacement is expected to be greatest. The coil and magnet are mounted on opposing structures, for example, the magnet is mounted on the tube 16 and the coil is mounted on the stationary package wall. The magnet will move in and out of the coil, if inducing a current in the coil. This current is proportional to the velocity of the magnet relative to the coil. Since this is a velocity measurement, the velocity, and thus the signal, is at the maximum when the flow tube 16 crosses its rest point (zero crossing). The Coriolis force induced twist causes a phase shift in the velocity signal that is detected by measuring the difference in the zero crossing times between the two velocity sensors. In practice this places a large accuracy burden on the time measurement circuitry. This may limit the ultimate sensitivity of mass flow measurement by this technique.

Aspects of the present invention provide a flow measurement technique that provides for a lower flow capability, is more direct and requires less accuracy in the circuitry than typical time based signal conditioning techniques. Referring to the embodiments illustrated in FIGS. 2–4, displacement of the vibrating sensor tube is measured using two capacitance displacement gauges 50 positioned near the tube 16 at positions symmetric to the shape of the tube 16 so as to measure the twist in the sensor tube 16 due to the Coriolis force generated by a fluid moving through the sensor tube 16. In specific embodiments of the present invention, the capacitance displacement gauges 50 are miniaturized and surface mounted on the sensor package wall or on a sensor block inserted inside the loop of the flow sensor tube. The twist in the sensor tube 16 due to the Coriolis force results in a phase shift between the two signals from the capacitance displacement gauges 50. Since this is a displacement measurement, the signal is directly proportional to the displacement. The relative displacement of each side of the tube is measured as a phase shift. The gauge driver and signal conditioning electronics translate the relative displacement of the tube 16 into a high level signal which is a function of the phase shift that can be used to measure the Coriolis effect when flow is established through the tube 16.

Figure 6:
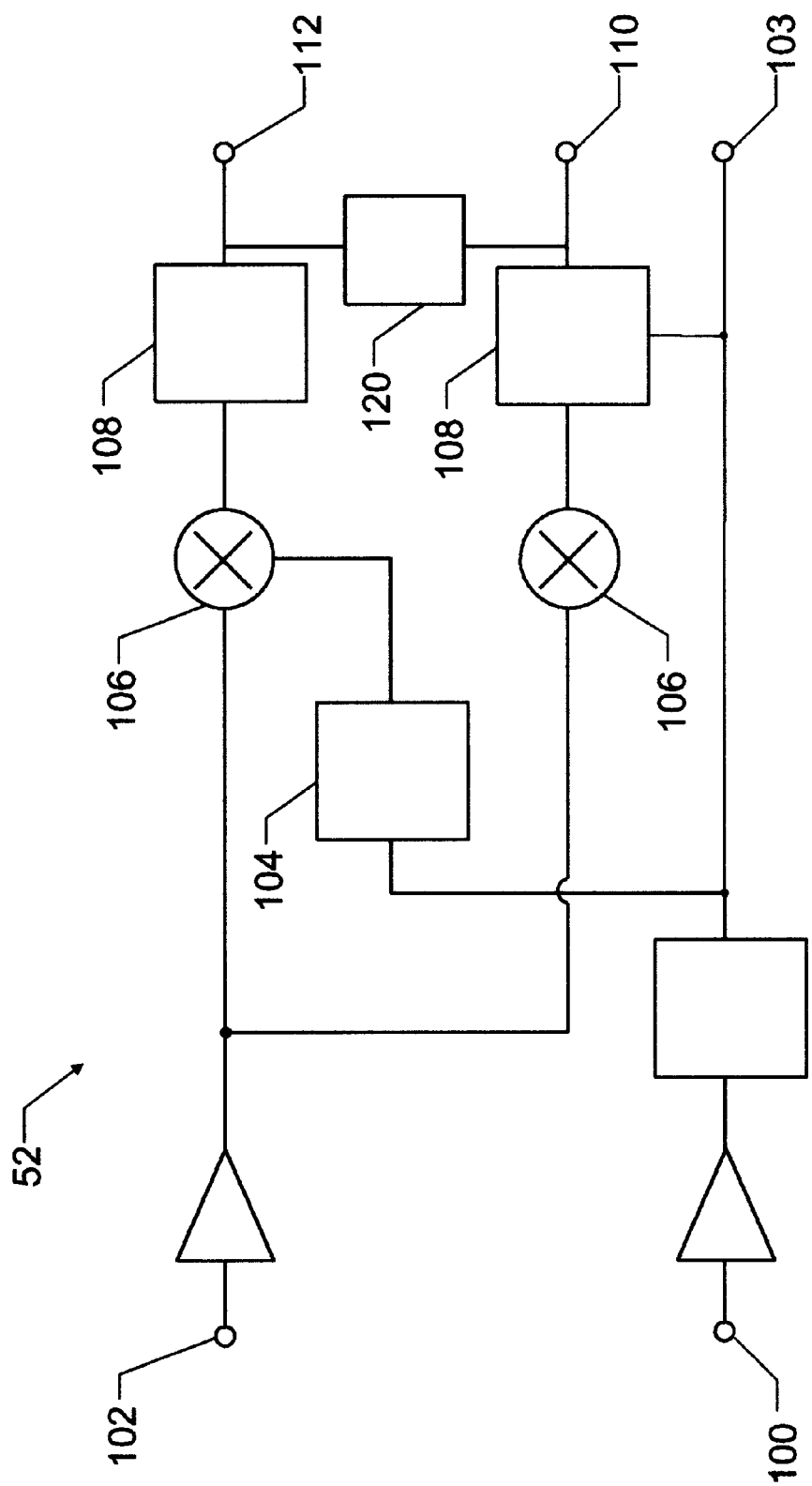
FIG. 6 is a schematic of a lock-in amplifier for measuring the Coriolis force induced phase shift in accordance with the present invention.

A first signal processing technique uses a lock-in amplifier with a reference signal supplied by one of the displacement gauges 50, and an input signal supplied by the other displacement gauge 50. Either gauge 50 may supply the reference or the input signal. The phase output from the lock-in amplifier is proportional to flow. FIG. 6 is a functional schematic of a lock-in amplifier 52, with which such a method for measuring the Coriolis force induced phase shift in accordance with the present invention may be implemented. The signals are moving left to right as illustrated in FIG. 6. The Left input 100 and Right input 102 signals are from the Left and Right displacement gauges 50 respectively. For example, the Left input 100 may be used as the reference signal. The sine out 103 is the drive signal, phase locked to the Left input 100 signal. This will drive the flow sensor tube 16 at resonance. The Right Input 102 signal is mixed with the Left/Reference Input 100 signal and its 90° phased shifted signal 104 in the two Phase Sensitive Detectors (PSDs) 106. Functionally, the PSDs 106 multiply the two signals, producing a high frequency component and a DC component. The low pass filters 108 remove the high frequency component producing a DC voltage at the X and Y outputs 110, 112. The X output 110 is called the "in-phase" component and the Y output 112 is called the "quadrature" component of the vector signal relative to the reference signal. Each of these components is phase sensitive; however, the vector magnitude and phase components can be separated by the following relationships:

$$R=\sqrt{X^2+Y^2}, \text{ the magnitude} \qquad \text{Eq. 1}$$

$$\theta=\tan^{-1}(Y/X), \text{ the phase angle.} \qquad \text{Eq. 2}$$

The relationship between the outputs from the lock-in amplifier 52 and the inputs from the displacement gauges 50 is derived as follows:

Consider the two signals as sine waves with arbitrary amplitudes and arbitrary phase difference. Each signal can be represented as below:

$$V_{left}=V_{ref}=A \sin \omega t$$

$$V_{right}=B \sin(\omega t+\phi)$$

At the bottom PSD 106 the following operation occurs:

$$X'=V_{ref}*(V_{right})=A \sin \omega t *[B \sin(\omega t+\phi)]$$

$$X'=\tfrac{1}{2}AB[\cos \phi - \cos(2\omega t+\phi)]$$

This signal has a DC voltage component and an AC component at twice the frequency. The Low Pass Filter (LPF) 108 removes the AC component leaving $$X=\tfrac{1}{2}AB \cos \phi.$$

At the top PSD 106 the following operation occurs:

$$Y'=A \cos \omega t \ast [B \sin(\omega t+\phi)]$$

We have a cosine multiplier since $\cos \omega t = \sin(\omega t + 90°)$.

$$Y'=-\tfrac{1}{2}AB \sin \phi + \tfrac{1}{2}AB \sin(2\omega t+\phi)$$

Again, we have a signal with AC and DC components, which after passing through the LPF 108, results in the following:

$$Y=-\tfrac{1}{2}AB \sin \phi.$$

Calculating the magnitude, R, and the phase angle, θ, from equations 1 and 2 we have:

$$R=\tfrac{1}{2}AB$$

and $$\theta=\phi$$

These calculations may be executed by any suitable digital or analog processing device 120. The vector phase is proportional to mass flow.

Figure 7:
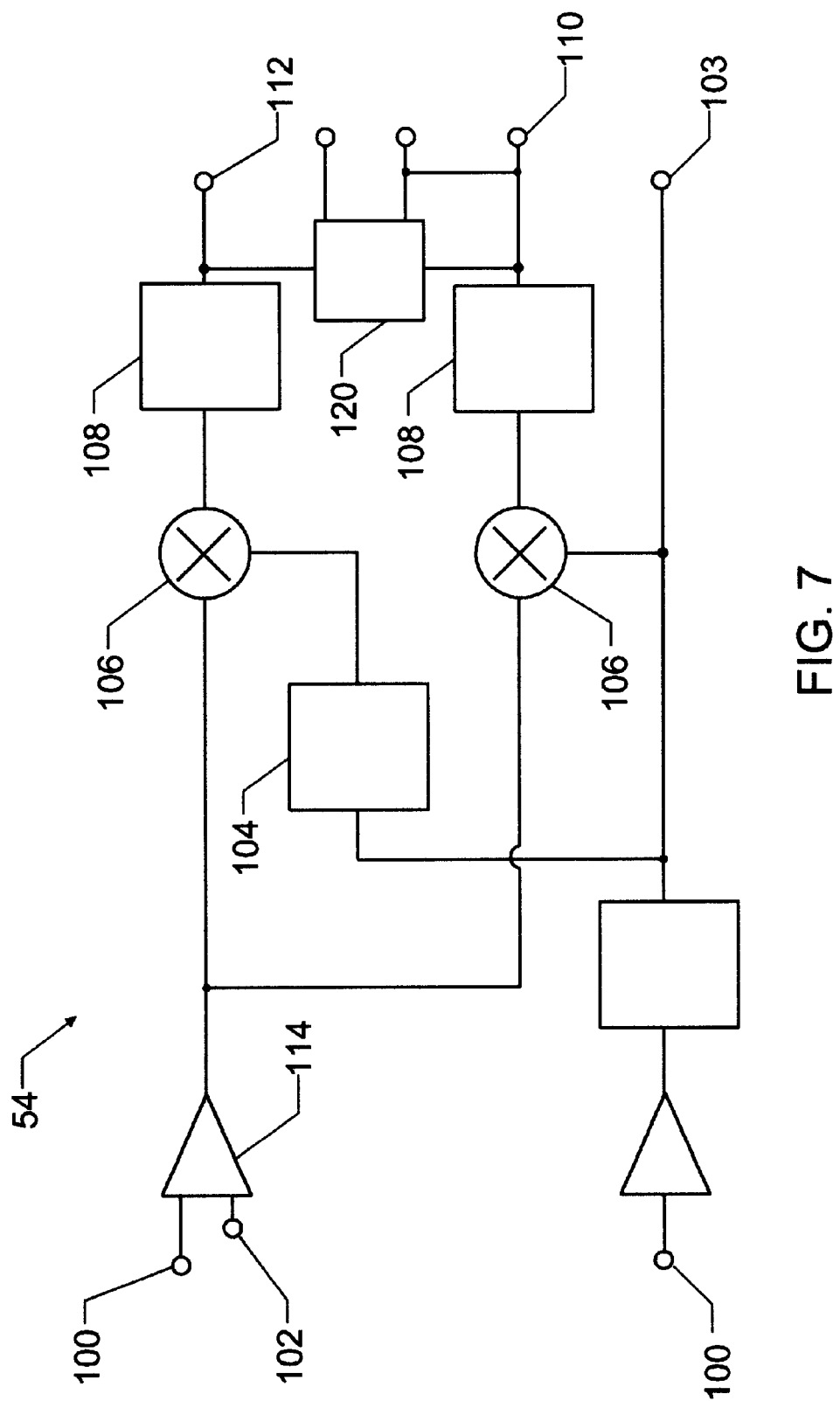
FIG. 7 is a schematic of a dual channel lock-in amplifier for measuring the Coriolis force induced phase shift in accordance with the present invention.

Another method in accordance with embodiments of the invention requires a dual channel lock-in amplifier with the reference signal and one input signal supplied by one of the displacement gauges 50 and a second input signal supplied by the other displacement gauge 50. The difference between the two input signals is then measured against the reference signal. The resultant phase output from the lock-in amplifier is proportional to flow. FIG. 7 is a functional schematic of a dual channel lock-in amplifier 54. The signals are moving in the same manner and have the same definitions as in FIG. 6. The Left input 100 is also used as the reference signal. As before, the sine out 103 is the drive signal, phase locked to the Left input 100 signal. In this case, the Left Input 100 signal is subtracted from the Right Input 102 signal and mixed with the Left/Reference Input 100 signal and its 90° phased shifted signal 104 in the two Phase Sensitive Detectors (PSDs) 106. The internal functions are the same as in the lock-in amplifier 52 of FIG. 6.

The following derivation may be used to determine the relationship between the outputs from the lock-in amplifier 54 and the inputs from the displacement gauges 52. Any suitable digital or analog processing device 120 may be used to perform the calculations.

Consider the two signals as sine waves with arbitrary amplitudes and arbitrary phase difference. Each signal can be represented as below:

$$V_{left}=V_{ref}=A \sin \omega t$$

$$V_{right}=B \sin(\omega t+\phi)$$

The output of the Low Noise Differential Amplifier 114 in this case will be $V_{ref}-V_{right}$.

At the bottom PSD 106 the following operation occurs:

$$X'=V_{ref}(V_{ref}-V_{right})=A \sin \omega t[A \sin \omega t - B \sin(\omega t + \phi)]$$

$$X'=\tfrac{1}{2}A^2[1-\cos 2\omega t]-\tfrac{1}{2}AB[\cos \phi + \cos(2\omega t+\phi)]$$

This signal has a DC voltage component and an AC component at twice the frequency. The Los Pass Filter (LPF) 108 removes the AC component leaving $$X=\tfrac{1}{2}A^2-\tfrac{1}{2}AB \cos \phi.$$

At the top PSD 106 the following operation occurs:

$$Y'=A \cos \omega t[A \sin \omega t - B \sin(\omega t+\phi)]$$

We have a cosine multiplier since $\cos \omega t = \sin(\omega t + 90°)$.

$$Y'=\tfrac{1}{2}A^2 \sin 2\omega t -\tfrac{1}{2}AB \sin \phi - \tfrac{1}{2}AB \sin(2\omega t+\phi)$$

Again, we have a signal with AC and DC components, which after passing through the LPF, results in the following:

$$Y=-\tfrac{1}{2}AB \sin \phi.$$

Figure 8:
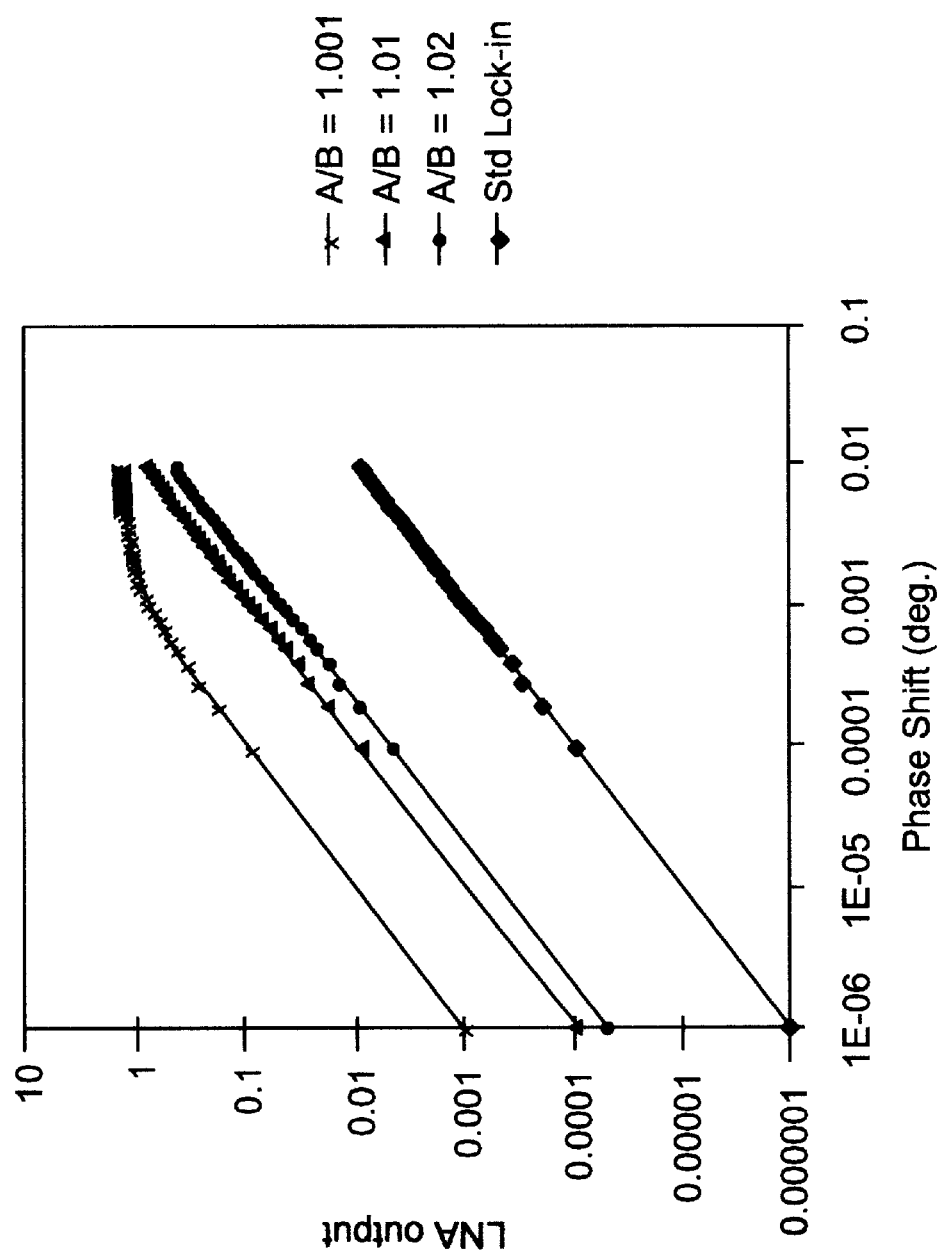
FIG. 8 is a graph illustrating the relationship between the amplitudes of input signals from sensor tube position sensors using signal processing methods in accordance with the present application.

Calculating the magnitude, R, and the phase angle, θ, from equations 1 and 2 we have:

$$R=\tfrac{1}{2}A\sqrt{\sqrt{A^2+B^2-2AB\cos\phi}}$$

and $$\theta = \tan^{-1}\left(\frac{B\sin\phi}{B\cos\phi - A}\right)$$

θ is no longer the phase angle, but is the arctangent, a function of the phase angle and the amplitudes of the Left and Right input signals. Analysis of this equation shows that θ is a strong function of φ. In fact, the relative amplitudes of the input signals can control the strength of this function. This can be illustrated in graph shown in FIG. 8, in which A and B are the amplitudes of the Left and Right signals respectively. As the amplitudes are more closely matched, the sensitivity is higher for the lock-in amplifier output,θ. Even for amplitudes that are matched within 2%, the sensitivity of θ to φ is nearly 100 times that of the standard lock-in amplifier configuration.

Figure 9:
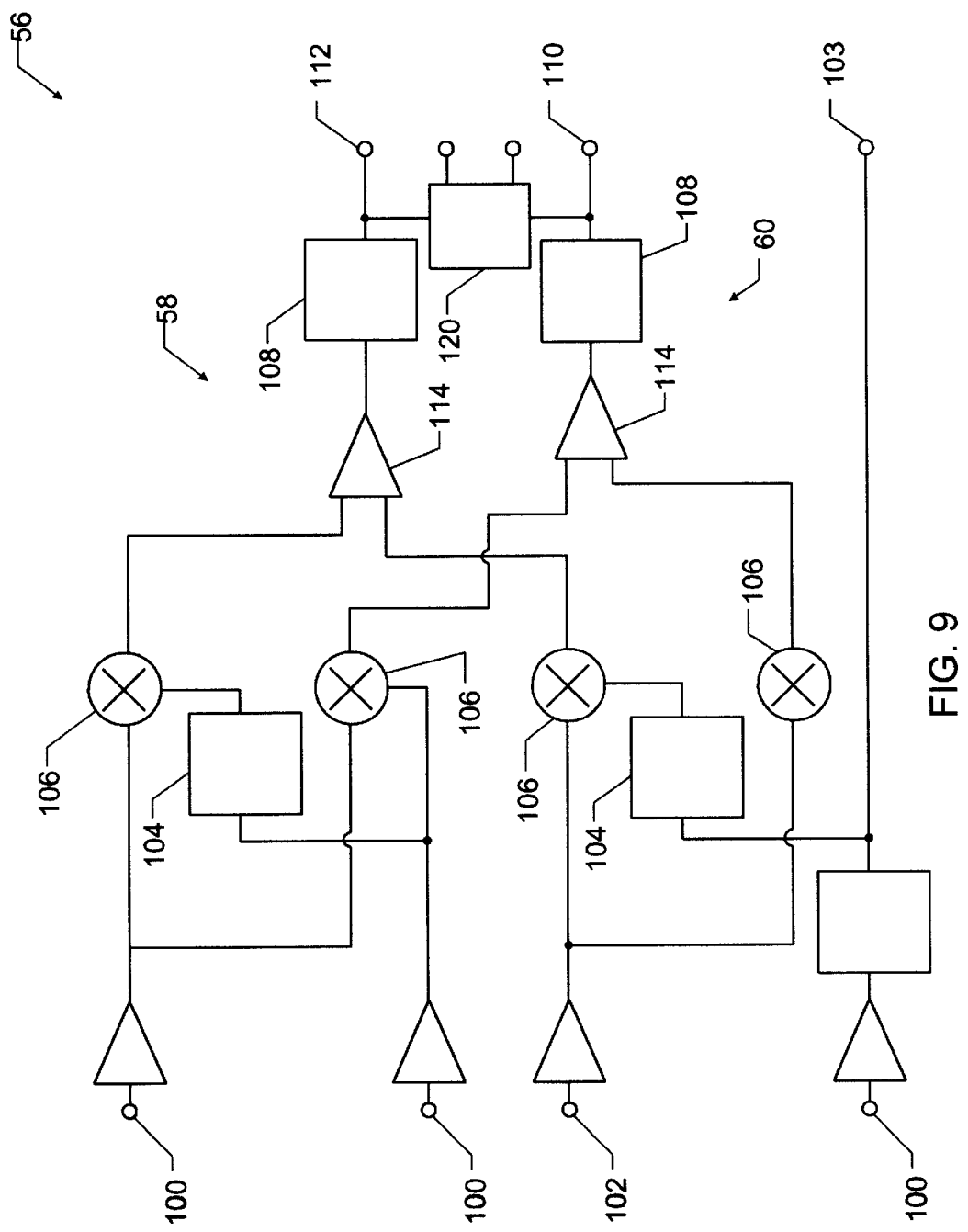
FIG. 9 is a schematic of a dual lock-in amplifier for measuring the Coriolis force induced phase shift in accordance with the present invention.

FIG. 9 is a functional schematic of a dual lock-in amplifier 56 with which another exemplary method for measuring the Coriolis force induced phase shift in accordance with the present invention is implemented. The signals are moving in the same manner and have the same definitions as disclosed above. The Left input 100 is also used as the reference signal. As before, the sine out 103 is the drive signal, phase locked to the Left input 100 signal. In this case, the Left Input 100 signal is mixed with itself and its 90° phased-shifted signal in the two Phase Sensitive Detectors (PSDs) 106 in the top lock-in amplifier 58. In the bottom lock-in amplifier 60, the Right Input 102 signal is mixed with the Left Input 100 signal and its 90° phased-shifted signal in the two Phase Sensitive Detectors (PSDs) 106. The paired outputs from the non-phase shifted PSDs 106 and phase shifted PSDs 106 are differentiated in the two Low Noise Differential Amplifiers 114. The DC components of the signals are passed by the Low Pass Filters 108 to give the usual lock-in amplifier outputs. The mathematics, which may be executed by any suitable digital or analog processing device 120, are the same as in the method outlined above in conjunction with FIG. 7, though the order in which the operations occur is different. In the Dual Channel Lock-in technique of FIG. 7, two high level signals, with very small differences are subtracted. The low-level signal is then multiplied with a high level signal, which can introduce noise in analog circuits or round off errors in digital circuits. In the Dual Lock-in technique of FIG. 9, the high level signals are first multiplied and the resulting signals, which are close in amplitude, are then subtracted resulting in an output with lower noise.

A lock-in amplifier's use is most notable with respect to measuring a low-level signal that is buried in noise of a much higher amplitude. The lock-in amplifier accomplishes this by acting as an extremely narrow bandpass filter. The signal and noise is multiplied by a reference sine and cosine wave, and then passed through a low-pass filter to remove the reference frequency. The result of the multiply/filter operations are DC signals that represent a complex vector (x+iy). The phase difference between the reference frequency and the signal of interest can be determined by atan(y/x).

Figure 10:
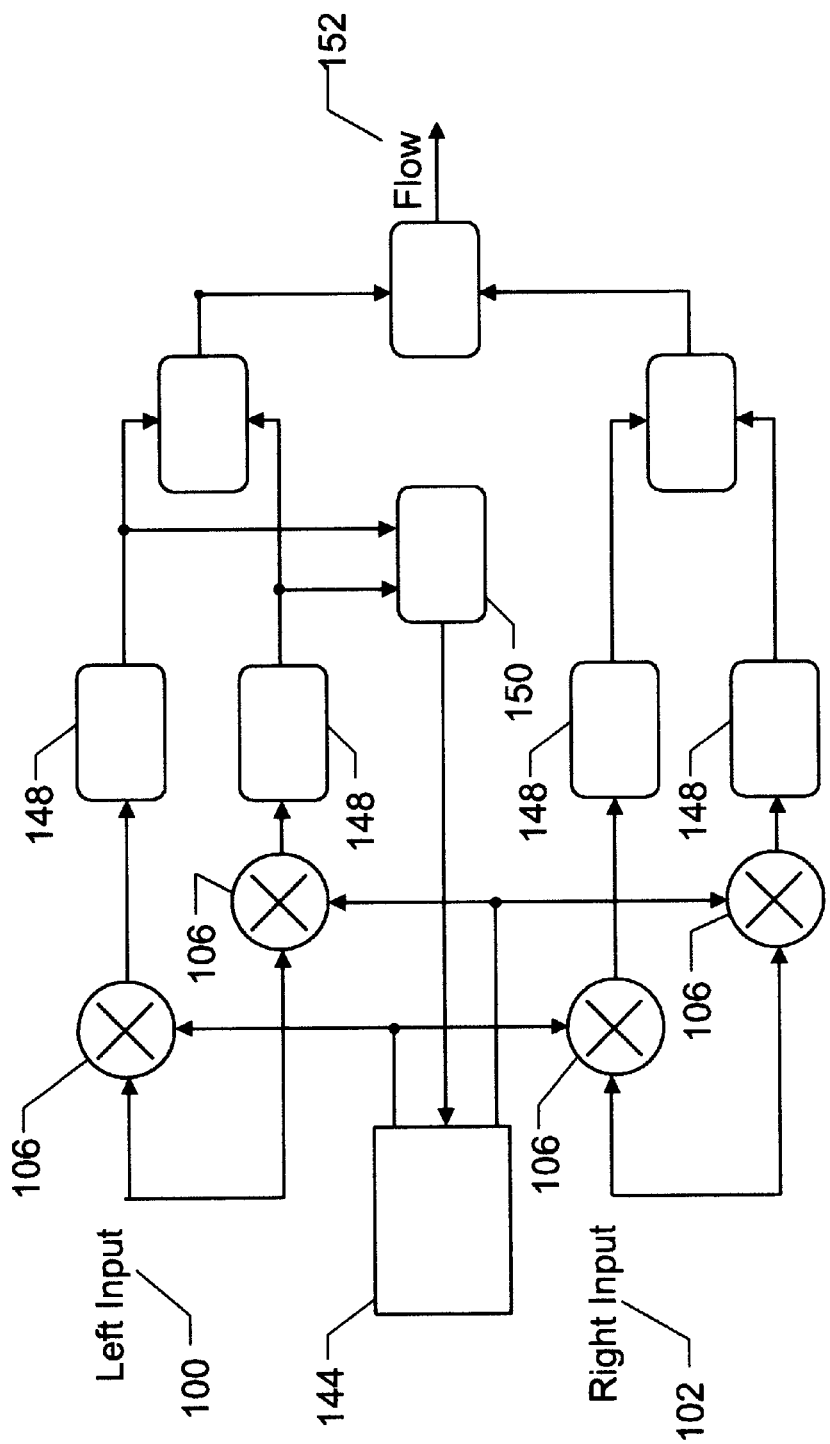
FIG. 10 is a schematic of a dual lock-in amplifier including reference frequency adjustment for measuring the Coriolis force induced phase shift in accordance with the present invention.

In terms of measuring Coriolis force, the phase difference between two signals of the same frequency is of interest. This can be accomplished using dual lock-in amplifiers, each driven with the same reference frequency as shown in FIG. 10. In the functional schematic illustrated in FIG. 10, Left and Right input signals 100, 102 are multiplied by reference sine and cosine waves provided by a reference frequency generator 144. The input signals 100, 102 are mixed with the sine and cosine signals in PSDs 106, then passed through fifth-order bessel IIR low pass filters 148 as described in conjunction with FIG. 6, FIG. 7 and FIG. 9. The multiply/filter process described above is performed on the Left and Right input signals 100, 102 with a resulting phase difference output X, Y of each signal with respect to the reference frequency. The difference between the two output signals X, Y represents the phase difference between the two input signals 100, 102. In the case of Coriolis mass flow, this phase difference represents an indication of mass flow 152.

When using lock-in amplifiers to measure the extremely small phase differences associated with Coriolis mass flow, it is necessary to adjust the reference frequency to match the signal of interest. If the reference signal is not very close to the signal of interest, a very low frequency AC signal will appear at the outputs of the low-pass filters 148. The frequency of the Coriolis sensor changes with mass flow, temperature, density and pressure, further complicating the measurement process.

The reference frequency can be adjusted accurately by processing the output vector from one of the input signals 100, 102. First, the derivative of the output vector is calculated. This may be accomplished by calculating the complex difference between two consecutive output vectors. Then, the original output vector is rotated 90 degrees and the dot product of this vector and the derivative is calculated, resulting in an error signal 150 that is provided to the reference frequency generator 144. The error signal 150 is negative, positive, or zero, if the reference frequency needs to be adjusted down, up or unchanged, respectively.

The amount of reference frequency adjustment is dependent on the accuracy of the phase measurement, but generally, the finer the adjustment, the better the accuracy as determined by calculating the standard deviation over a number of output samples. However, the finer adjustment (small step changes) of reference frequency will be detrimental if there are step changes in the signal frequency, as the reference frequency generator 144 will take too long reaching the intended frequency. If the signal frequency experiences frequent step changes, a PID or adaptive algorithm can be used to adjust the reference frequency in a more responsive manner.

In alternative embodiments, the capacitance displacement probes 50 may be mounted on piezoelectric actuators that would, first, align the capacitance displacement probes 50 in three dimensions. Further, when used with the dual channel lock-in amplifier or dual lock-in amplifier methods disclosed herein, the piezoelectric actuators can dynamically adjust the sensitivity of the of the flow sensor, thereby providing an extended range of operation.

Such dynamic positioning provides compensation for manufacturing variability, particularly the positioning of the flow sensor tube relative to the capacitance displacement probe. Dynamic positioning also provides compensation for dimensional shifts due to relative thermal expansion of the various components. Used in combination with the dual channel lock-in amplifier or dual lock-in amplifier, dynamic positioning allows the two displacement signals to be closely matched to provide an adjustable sensitivity to flow. A low sensitivity would be used for high flow conditions while high sensitivity would be used for extended low flow conditions, thereby increasing the dynamic range of flow measurement.

Figure 11:
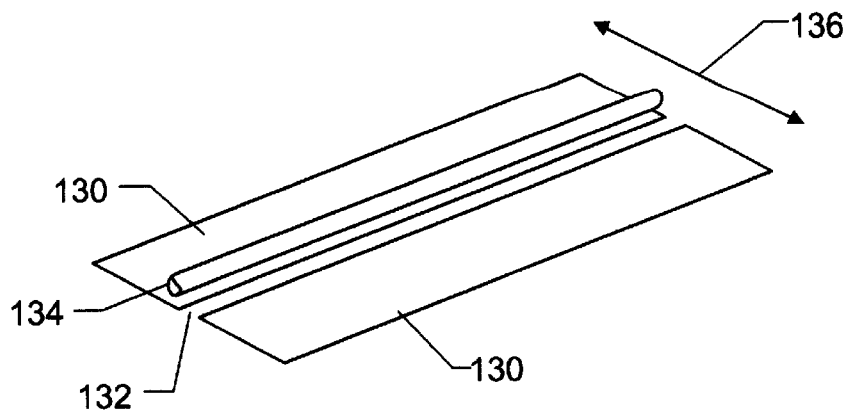
FIG. 11 illustrates a first embodiment of a capacitive displacement probe in accordance with the present invention.

Embodiments of the present invention additionally provide improved capacitance measurement techniques, specifically, a novel geometry of the capacitance displacement probe. Normally, the displacement of an object is measured as a distance normal to the capacitance displacement probe. The displacement may also be measured as a distance tangential to the capacitance displacement probe. Referring to FIG. 11, this can be accomplished by placing two plates 130 side by side with a uniform gap 132 between the plates 130 and placed near a sensor tube 134 in the plane tangential to the motion (indicated by the arrow 136) as shown in FIG. 11. In one embodiment, the plates 130 will be at the same potential and the sensor tube 134 will be at ground potential. The sensor tube 134 is positioned directly over the gap 132 between the plates 130 with the expected motion 136 normal to the gap so that cyclic motion of the sensing tube 134 will position the tube 134 more closely to one plate 130 than the other 130. The relative capacitance is measured between each of the plates 130 and the sensor tube 134. As the sensor tube 134 moves over one plate 130 or the other, the amount of area contributing to the capacitance will change and thus the relative capacitance measured.

Figure 12:
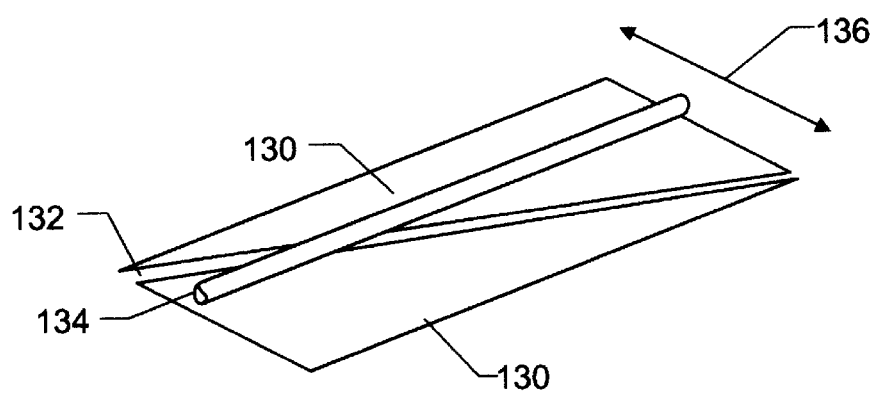
FIG. 12 illustrates a second embodiment of a capacitive displacement probe in accordance with the present invention.

An alternative configuration has the gap 132 running diagonally across the sensor tube 134 as shown in FIG. 12. This allows a less precise placement of the sensor tube 134 over the plane of the plates 130. Misalignment of the sensor tube 134 will cause a smaller mismatch in the signal as compared to the parallel gap 132.

Figure 13:
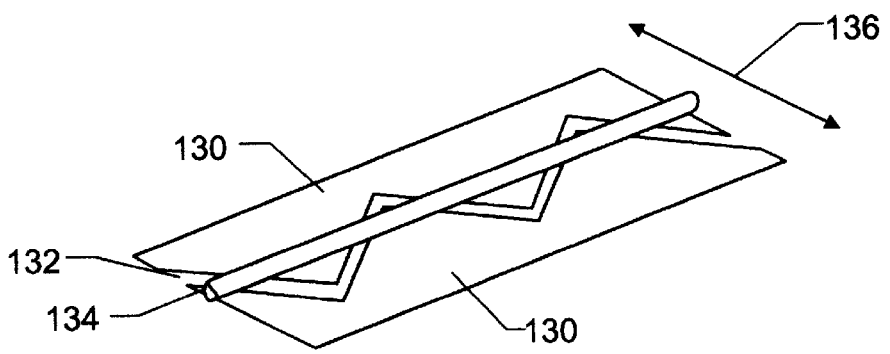
FIG. 13 illustrates a third embodiment of a capacitive displacement probe in accordance with the present invention.

A further embodiment has the gap 132 in a "saw tooth" pattern as shown in FIG. 13. This is an improvement over the diagonal gap 132 in that an angular misalignment of the sensor tube 134 with respect to the gap 132, whether parallel or diagonal, will cause a difference in the rate of change of capacitance between the two plates 130. This will introduce an unwanted change in phase between the two signals. The "saw tooth" pattern will average out any angular misalignment of the sensor tube 134, providing more symmetrical signals.

Figure 14:
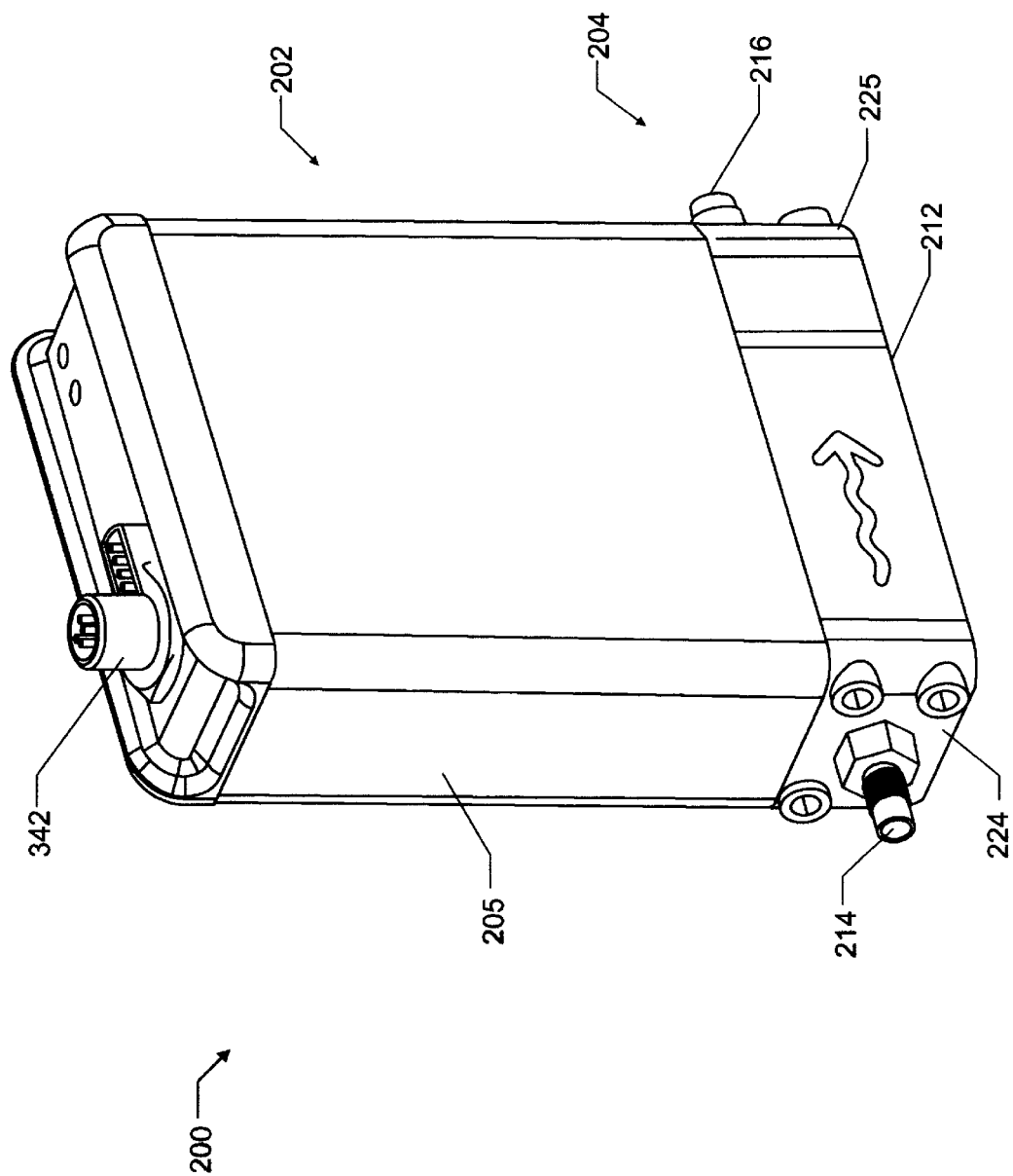
FIG. 14 is a perspective view of a Coriolis mass flow controller in accordance with an embodiment of the present invention.
Figure 15:
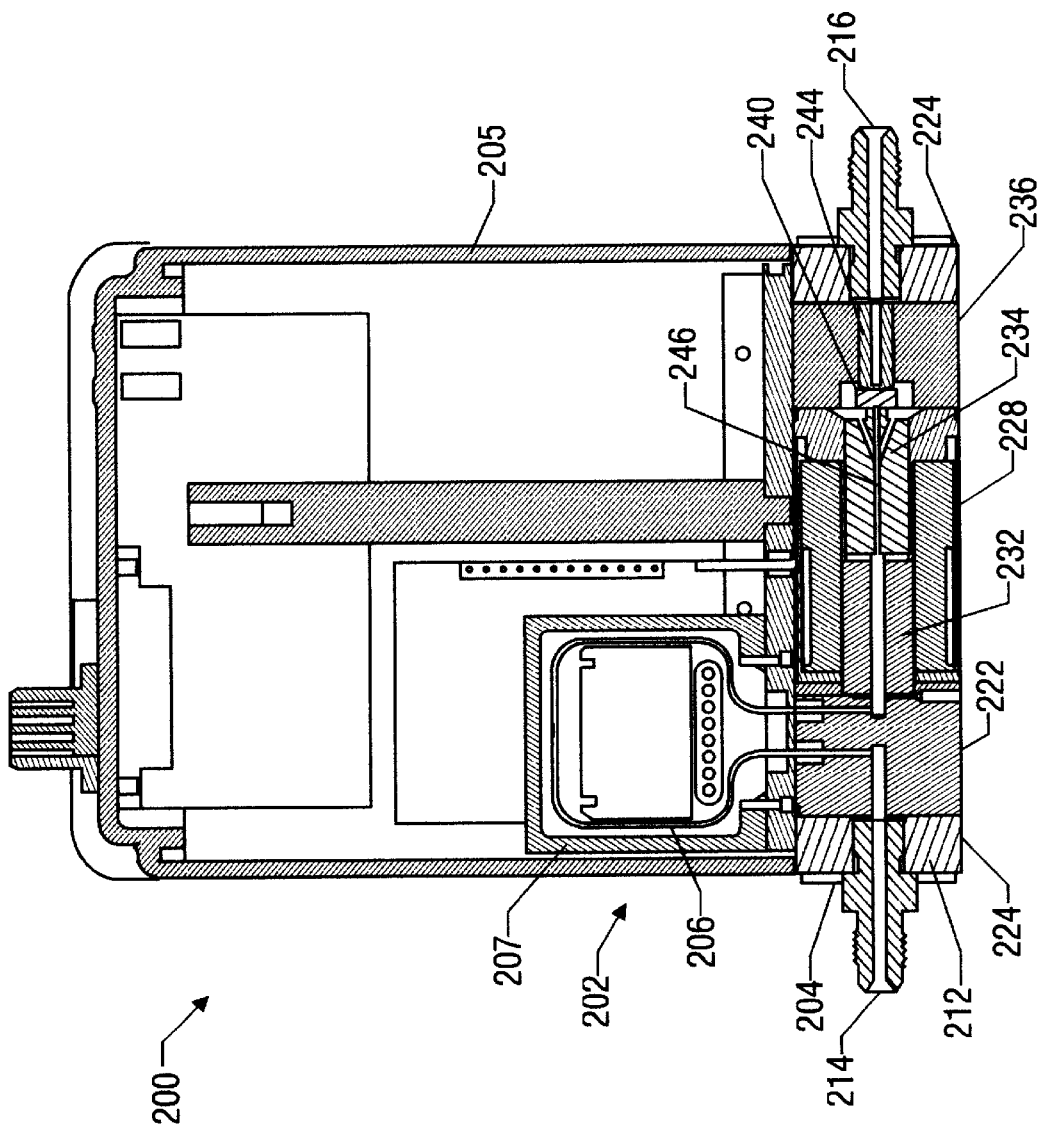
FIG. 15 is a sectional view of the Coriolis mass flow controller shown in FIG. 14.
Figure 16:
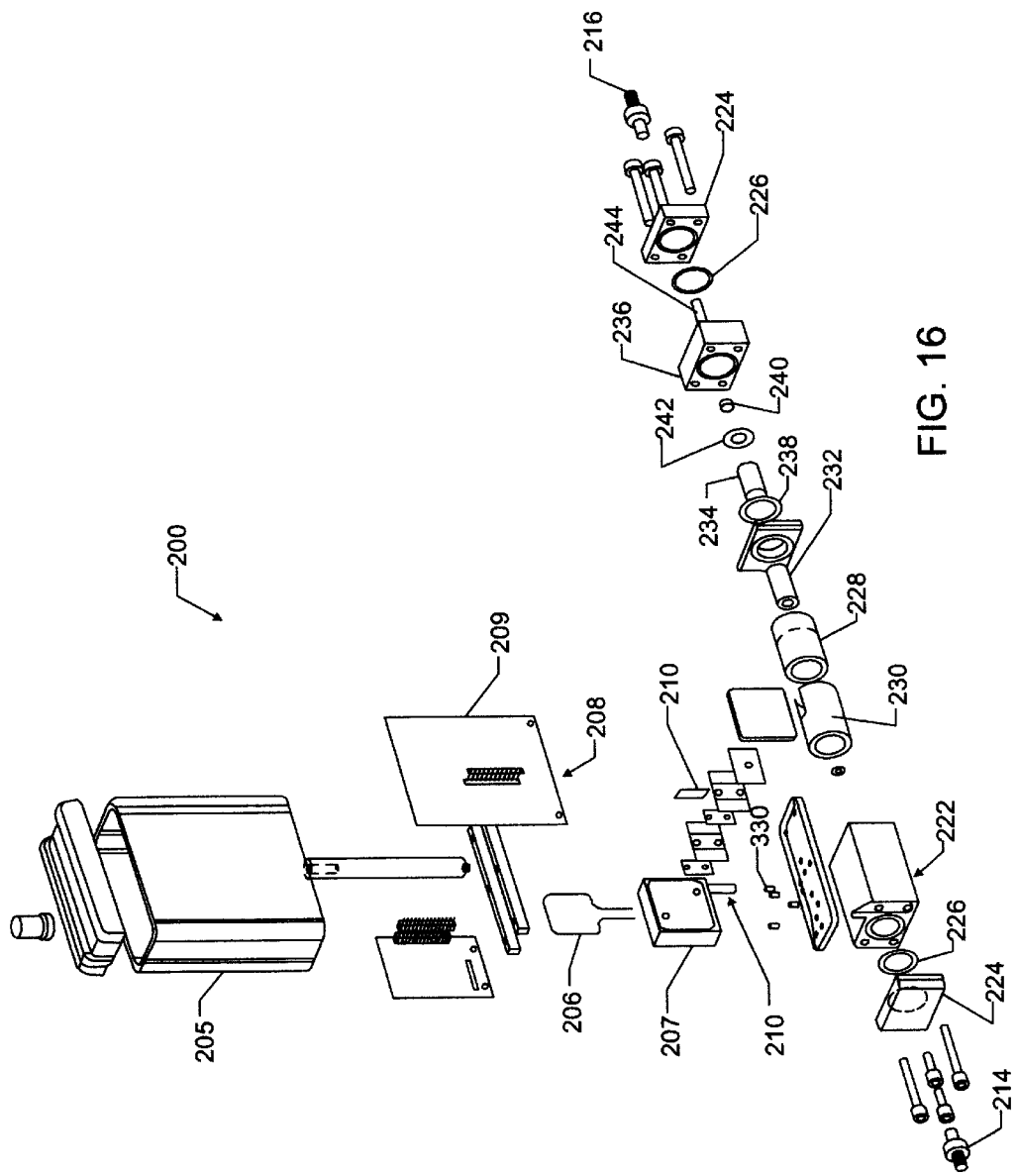
FIG. 16 is an exploded view of the Coriolis mass flow controller shown in FIG. 15.

FIG. 14, FIG. 15 and FIG. 16 illustrate an exemplary low flow Coriolis mass flow controller 200 in accordance with an embodiment of the present invention. The Coriolis mass flow controller 200 includes a flow sensor portion 202 and a flow control portion 204. A processor either internal or external to the mass flow controller 200 receives an indication of a set point, or desired mass flow. The set point value is compared to the actual mass flow as indicated by flow sensor portion 202 to generate an error value. The flow control portion 204 includes a valve that is manipulated to adjust the flow rate and minimize the error. The implementation of particular control schemes would be a routine undertaking for one skilled in the art having the benefit of this disclosure, and thus, the specifics of such an implementation are not addressed in detail herein.

The flow sensor portion 202, which is surrounded by an enclosure 205, includes a sensor tube 206, which in the embodiment illustrated, has a generally rectangular shape. Other tube shapes, such as those disclosed herein, may also be used in the flow sensor portion 202.

In existing Coriolis devices, the sensor is typically enclosed in a welded metal housing. The sensor tube within the housing also has attached to it displacement or velocity sensors with wires connecting through feedthroughs to electronics outside the housing. The sensor tube in such devices is relatively large and has a resonant frequency that is about 100 Hz. For smaller sensor tubes, as in embodiments of the present invention, the resonant frequency is somewhat higher, on the order of 200 Hz and greater. As the frequency increases, there will be an increased viscous damping effect due to the atmospheric conditions inside the sensor enclosure. By evacuating the enclosure and utilizing vacuum compatible materials inside the enclosure, the viscous damping can be reduced or even eliminated. Thus, in the exemplary embodiment illustrated, the sensor tube 206 is situated within a vacuum sensor housing 207.

A drive device, such as the electromagnetic, electrostatic, acoustic, or piezoelectric drive systems disclosed herein, is situated relative to the tube 206 to cause it to vibrate. Referring to FIG. 16, the drive device is indicated generally by reference number 208. In the illustrated embodiment, an inductor is mounted on a circuit board 209 that is positioned adjacent the sensor housing 207 to drive the tube 206. In one embodiment, the inductor has a value of about 1 mH. In the exemplary embodiment illustrated in FIGS. 14–16, capacitance displacement gauges 210, such as disclosed herein above, are mounted relative to the tube 206 to measure the twist in the tube 206 due to the Coriolis force generated by a fluid moving through the tube 206. The sensor tube 206 is mounted to a base portion 212, which defines a flow inlet 214 and a flow outlet 216, such that a flow passage is provided from the inlet, through the flow sensor tube 206, through the flow control portion 204, and through the sensor flow outlet 216.

The flow control portion 202 includes a meter body 222 with a valve coil 228 and coil cover 230 situated therein. A valve stem 232 and plunger 234 are situated within the valve coil 228, and a valve body 236 is connected to the meter body 222 with a seal 238 therebetween. A valve seat 240, a spring 242 and an orifice 244 are positioned within the valve body 236. End blocks 224, 225 are situated on either end of the flow control portion 204 with seals 226 provided between the meter body 222 and end block 224, and between the valve body 236 and end block 225.

In the event that there are bubbles in the fluid, the annular opening around the plunger in a conventional valve restricts the passage of bubbles to the outlet of the valve. Bubbles will collect at the entrance of the annular opening to the point that the liquid flow will be restricted and flow control will be lost. If the annular opening is enlarged, the increased spacing of the plunger from the valve coil will reduce the field strength in the magnetic circuit and thus reduce the effective force that can be achieved in order to open or close the valve against hydraulic forces created by the fluid. Thus, in the illustrated Coriolis mass flow controller 200, a circular hole 246 is provided through the plunger 234. The circular hole 246 is compatible with the shape and size of the bubbles, allowing bubbles to pass more freely through the valve. This minimizes the possibility of flow restriction caused by the bubbles. The hole 246 through the center of the plunger 234 minimizes any effects on the magnetic circuit so that the force to open and close the valve against hydraulic forces is maintained.

With typical existing valves, the valve plunger has a captive seat that is made from some deformable material that, when pressed against the land of the orifice, will form a seal against flow. In the case of a normally closed, solenoid type valve, the force against the seat may be generated by a spring balanced so that the solenoid action lifts the seat from the orifice land. In the case of a normally open, solenoid type valve, the force against the set is generated by the solenoid action and is balanced so that the spring lifts the seat from the orifice when the magnetic field is removed. The seat material may be elastomeric, plastic, or a ductile metal.

It is usually preferable to have elastic deformation over plastic deformation so that the seal is repeatable. Alternatively, hard materials may be used for the seat and land, but fabricated to very tight tolerances including highly matched surfaces between the seat and land. This is a high cost approach. The spacing between the seat and land is critical to valve operation since the magnetic force on the plunger is not linear with displacement. In the case of a normally open valve, the normal position of the plunger and thus the seat relative to the land needs to be optimized in order to provide the maximum force when the seat is moved against the land, while allowing the maximum flow in the open position. In a normally closed valve, the force of the seat against the land is generated by the spring. The spring force needs to be sufficient to close against hydraulic forces, yet minimized to allow the magnetic force to lift the seat from the land sufficient distance to allow maximum flow.

Figure 17A:
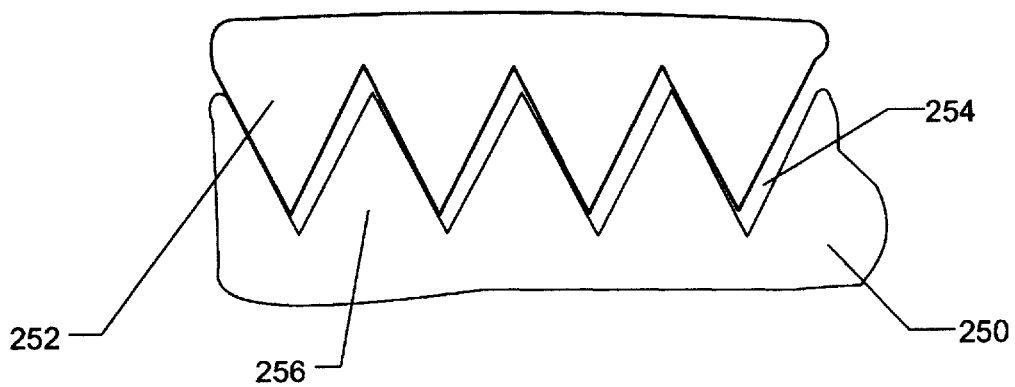
FIGS. 17A and 17B illustrate aspects of a prior art threaded valve connection and a sealed threaded valve connection in accordance with the present invention, respectively.

Existing devices may use a variety of means to adjust the spacing between the seat and land, including placing shims under the land or seat, or having a threaded adjustment screw in the orifice component. As shown in FIG. 17A, however, a typical threaded adjustment in the orifice does not seal between the orifice body 250 and the valve body 252, leaving a leak path 254 between threads 256. Such a threaded adjustment requires that the threads 256 be sealed against fluid leakage. A separate seal, such as an o-ring or gasket provides this seal.

Figure 17B:
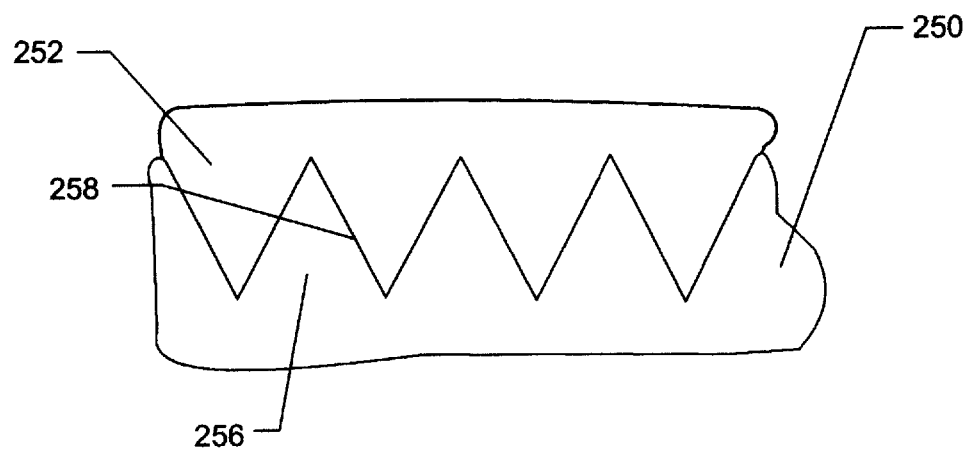

In accordance with aspects of the present invention, the orifice 244 and/or land are made of a plastic material, such as VESPEL®, which is machinable into a threaded component with a precision orifice. As shown in the exemplary embodiment illustrated in FIG. 17B, the threads 256 are machined oversized so that there is an interference fit 258 between the orifice body 250 and valve body 252, thus sealing, eliminating the need for a separate seal (o-ring or gasket). The orifice land now is the deformable member simplifying the design and manufacture of the valve seat 240 and plunger 234 (referring to FIGS. 15 and 16).

The present invention, however, is not necessarily limited to any specific valve plunger configuration. In alternative embodiments, a pump is used in place of the valve. A metering pump, for example, may be used for fluid control purposes. In particular, a piezoelectric pump may be employed that includes a plurality of piezoelectric tube portions. The piezoelectric tube portions are controlled in a manner to cause different tube portions to constrict or expand, thus allowing the fluid flow to be controlled as desired.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A device for determining mass flow from a Coriolis force-induced phase shift between first and second input signals detected by first and second displacement gauges, comprising:

a first phase sensitive detector coupled to the first and second displacement gauges to receive the first and second input signals, the first phase sensitive detector operable to mix the first and second input signals and provide an output representing the mixed first and second input signals;

a first phase shifter coupled to the first and second displacement gauges to receive the first input signal and operable to output a signal representing the first input signal phase shifted 90°;

a second phase sensitive detector coupled to the first phase shifter and the second displacement gauge to receive the first phase shifter output and the second input signal, the second phase sensitive detector operable to mix the phas shifted first input signal and the second input signal and provide an output representing the mixed signals;

a processor coupled to the first and second phase sensitive detectors to receive the mixed signals and operable to calculate the vector magnitude and phase of the mixed signals relative to each other, wherein the vector phase is proportional to mass flow;

a third phase sensitive detector coupled to the first displacement gauge to receive the first input signal at each of two inputs, the third phase sensitive detector operable to mix the first input signal with itself and provide an output representing the mixed first input signal;

a fourth phase sensitive detector coupled to the first phase shifter and the first displacement gauge to receive the first phase shifter output and the first input signal, the fourth phase sensitive detector operable to mix the phase shifted first input signal and the first input signal and provide an output representing the mixed signals;

a first differential amplifier coupled to the first and third phase sensitive detectors to receive the outputs of the first and third phase sensitive detectors and provide a differential signal to the processor, and a second differential amplifier coupled to the second and fourth phase sensitive detectors to receive the outputs of the second and fourth phase sensitive detectors and provide a differential signal to the processor.

2. The device of claim 1, further comprising first and second low pass filters coupled to the first and second phase sensitive detectors, the first and second low pass filters operable to remove high frequency components from the mixed signals and output DC voltages.

3. The device of claim 1, further comprising a third output terminal phase locked to the first input terminal for providing a sinusoidal output signal to drive a flow tube to resonance.

4. The device of claim 1, wherein the device comprises a lock-in amplifier.

5. The device of claim 1, further comprising first and second low pass filters coupled to the first and second differential amplifiers, the first and second low pass filters operable to remove high frequency components from the mixed signals and output DC voltages.

6. The device of claim 1, further comprising a second phase shifter coupled to receive the first input signal and operable to output a signal representing the first input signal phase shifted 90° to the fourth phase sensitive detector.

* * * * *

UNITED STATES PATENT AND TRADEMARK OFFICE
CERTIFICATE OF CORRECTION

PATENT NO.    : 6,513,392 B1  Page 1 of 1
DATED         : February 4, 2003
INVENTOR(S)   : Michael J. Barger et al.

It is certified that error appears in the above-identified patent and that said Letters Patent is hereby corrected as shown below:

<u>Column 13,</u>
Line 20, delete "phas" and insert -- phase --

Signed and Sealed this

Thirtieth Day of September, 2003

JAMES E. ROGAN
*Director of the United States Patent and Trademark Office*